United States Patent [19]
Staab et al.

[11] Patent Number: 5,468,003
[45] Date of Patent: * Nov. 21, 1995

[54] REINFORCED CORE HEAVY DUTY GASKET

[75] Inventors: Thomas E. Staab, Hinsdale; Kanu G. Shah, Arlington Heights; Paul E. Gallo, Berwyn; Paul V. Rakauskas, Melrose Park, all of Ill.

[73] Assignee: Dana Corporation, Toledo, Ohio

[*] Notice: The portion of the term of this patent subsequent to Nov. 8, 1974, has been disclaimed.

[21] Appl. No.: 173,885

[22] Filed: Dec. 27, 1993

Related U.S. Application Data

[63] Continuation of Ser. No. 23,403, Feb. 26, 1993, Pat. No. 5,362,074.

[51] Int. Cl.⁶ ............................................. F16J 15/12
[52] U.S. Cl. ................................. 277/235 B; 277/233
[58] Field of Search ..................... 277/235 R, 235 A, 277/235 B, 227, 231, 233, 234

[56] References Cited

U.S. PATENT DOCUMENTS

| | | |
|---|---|---|
| 1,974,633 | 9/1934 | Victor . |
| 3,567,234 | 3/1971 | Skrycki .................. 277/235 B |
| 4,204,691 | 5/1980 | Takase et al. ............ 277/235 B |
| 4,223,897 | 9/1980 | Staab et al. ............. 277/235 B |
| 4,234,638 | 11/1980 | Yamazoe et al. . |
| 4,465,287 | 8/1984 | Bindel et al. . |
| 4,754,982 | 7/1988 | Udagawa et al. ......... 277/235 B |
| 4,765,633 | 8/1988 | Hossack . |
| 4,776,602 | 10/1988 | Gallo . |
| 4,810,454 | 3/1989 | Belter . |
| 4,813,687 | 3/1989 | Nakayama et al. . |
| 4,822,062 | 4/1989 | Gallo et al. . |
| 4,956,226 | 9/1990 | Ashizawa et al. ........ 277/235 B |
| 5,062,649 | 11/1991 | Udagawa . |
| 5,087,058 | 2/1992 | Miura et al. . |
| 5,110,630 | 5/1992 | Abe et al. ............... 277/235 B |
| 5,172,920 | 12/1992 | Schlenk . |
| 5,275,139 | 1/1994 | Rosenquist ............. 277/235 B |
| 5,354,074 | 10/1994 | Jinno ..................... 277/235 B |
| 5,362,074 | 11/1994 | Gallo et al. ............. 277/235 B |

FOREIGN PATENT DOCUMENTS

| | | |
|---|---|---|
| 0094616A1 | 11/1983 | European Pat. Off. . |
| 58-200859 | 11/1983 | Japan . |
| 61-118548 | 6/1986 | Japan . |
| 4102765 | 4/1992 | Japan ..................... 277/235 B |

Primary Examiner—Daniel G. DePumpo
Attorney, Agent, or Firm—Dykema Gossett

[57] ABSTRACT

A gasket has two outer facing layers positioned on opposite sides of a central metal shim with a perforated core disposed between each facing layer and the shim. The thickness of the metal shim may be varied to control the overall thickness of the gasket. In one embodiment, the core is secured to the shim using a thermosetting adhesive and includes tangs which extend into a facing layer to clinch the core and facing layer together. Alternatively, the facing layers may also be secured to the shim using a mechanical fastener such as an eyelet so long as a sealing medium is disposed between at least the cores and the shim. The sealing medium may be thermosetting adhesive.

18 Claims, 2 Drawing Sheets

5,468,003

REINFORCED CORE HEAVY DUTY GASKET

This application is a Continuation-In-Part of application Ser. No. 08/023,403, filed Feb. 26, 1993 now U.S. Pat. No. 5,362,074.

BACKGROUND OF THE INVENTION

The present invention relates to an improved thermally conductive composite gasket for an internal combustion engine having improved strength characteristics and variable thickness.

A thermally conductive gasket having high strength, particularly in the radial direction, is essential in heavy duty applications. It has been proposed in the past to bond a facing layer to both faces of a heavy gauge solid metal shell. The metal shell provides strength while the facing layer facilitates the conformability of the gasket to its mating surfaces. Unfortunately, it has been difficult to practically achieve a gasket having a metal layer bonded to a facing layer. Under high loads, portions of the facing layer may begin to separate or slide relative to the metal shell.

There are manufacturing difficulties in bonding a solid metal core to a facing layer. Typically, a thermosetting adhesive is required for the bonding process. A thermosetting adhesive has the advantage of being able to withstand high temperatures such as those experienced within internal combustion engines. However, when a thermosetting adhesive is initially set, gases are generated, particularly from the adhesive itself. The generated gases are unable to escape and blistering of the facing layer typically results, reducing the effectiveness of the gasket.

Further, the bonding process must be carefully controlled or areas of reduced bonding may occur. In addition, the various layers may become misaligned during bonding. In particular, tracking can become a problem when hot rollers are used to cure the adhesive. Finally, during assembly, the facing layers may become curled, reducing the area of contact with the adhesive and complicating assembly operations. For example, arcing may occur if a curled facing layer comes into contact with an element of a preheating induction unit, vaporizing a portion of the adhesive.

SUMMARY OF THE INVENTION

A disclosed thermally conductive gasket for an internal combustion engine includes a central metal shim with outer facing layers positioned on opposite sides of the shim. A perforated metallic core with opposing first and second planar faces is secured to each of the layers and bonded directly to the shim.

The adhesive can withstand high temperature operation after setting. The facing layers and perforations in the cores enable gases formed during coating and setting of the adhesive to escape, minimizing blistering of the facing layers.

The cores and central shim provide higher strength, particularly in the radial direction. Tangs mechanically clinch a core to a facing layer to minimize facing layer separation and slippage under high load conditions.

The use of a central metal shim provides a number of advantages. The thickness of the facing layers may be minimized, increasing gasket strength without sacrificing conformability. Further, it is possible to construct thicker gaskets by simply varying the shim metal thickness.

In an alternative embodiment, the layers of the gasket are secured using a mechanical fastener such as one or more eyelets. Preferably, the mechanical fastener is placed in a region of the gasket not subjected to the clamping load of the mating elements of the engine. The eyelet eliminates the need for bonding multiple layers of metal together. Sealability is still required between the shim and the cores, however, to prevent gases or fluids from escaping through the gasket. A suitable sealing medium comprises a polymer coating adapted to withstand high temperature gasket operation. One such preferred coating is an elastomeric latex or gum rubber. Another suitable sealing medium comprises thermosetting adhesive, but setting and curing of the adhesive occurs during high-temperature gasket operation rather than before gasket installation. The adhesive also acts as a secondary means for securing the components together.

BRIEF DESCRIPTION OF THE DRAWINGS

The features and inventive aspects of the present invention will become more apparent upon reading the following detailed description, claims, and drawings, of which the following is a brief description:

DESCRIPTION OF DETAILED EMBODIMENTS

Figure 1:
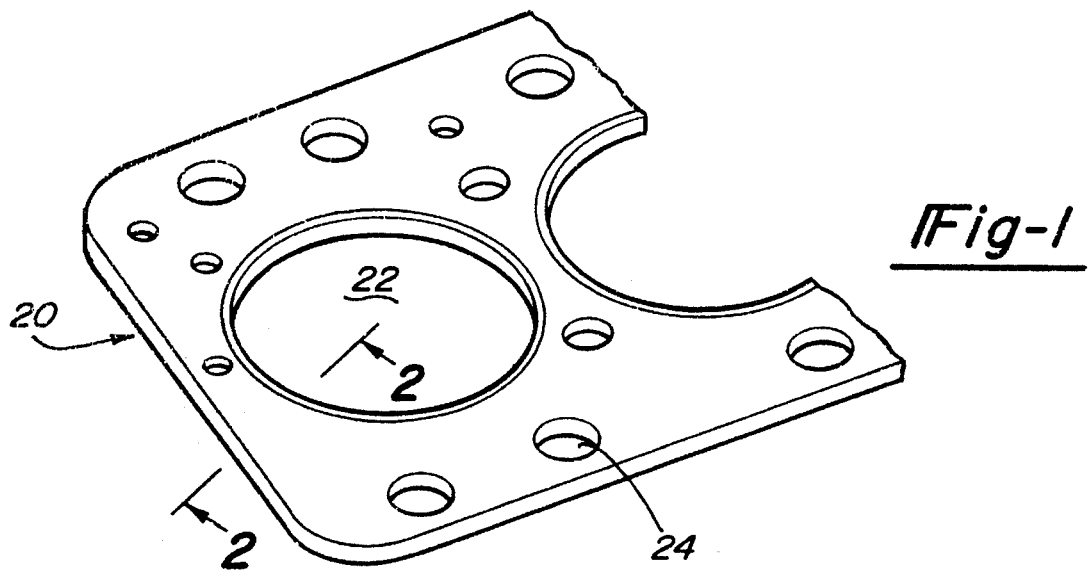
FIG. 1 is a perspective view of a portion of a gasket incorporating the present invention.
Figure 2:
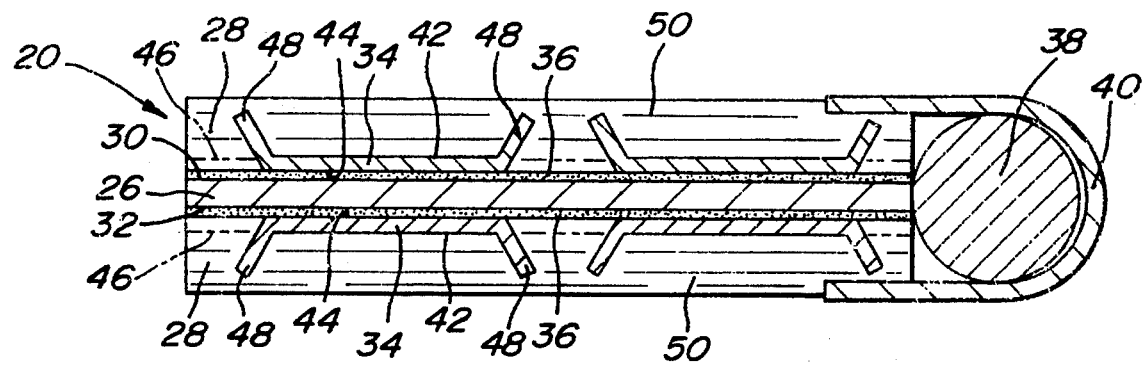
FIG. 2 is a cross-sectional view of a first embodiment of the present invention taken along line 2—2 of FIG. 1.

A cylinder head gasket 20 illustrated in FIG. 1 provides a combustion seal at cylinder bore openings 22, and at fluid flow openings 24. FIG. 2 illustrates the cross-section of the first embodiment of the present invention. Gasket 20 includes a central metal shim 26 with outer facing layers 28 positioned on opposite sides 30 and 32 of shim 26. A perforated metallic core 34 is disposed between each of layers 28 and shim 26. Core 34 is secured to facing layer 28 by clinching, and bonded to shim 26 by using a layer of thermosetting adhesive 36. A fire ring 38 is held in place by a fire ring holder 40.

Each core 34 includes a planar face 42 contacting an inner surface 46 of layer 28 with a pair of tangs 48 extending outwardly from planar face 42 and into facing layer 28. Each facing layer is thereby clinched to a core via the tangs, wherein the tangs impart additional strength to the facing layer and minimize the possibility of facing layer separation or slippage under high load conditions.

Thermosetting adhesive 36 has the characteristic of setting upon the application of heat to provide a bond that withstands high temperature engine operation. Preferred thermosetting adhesives include nitrile phenolic, silicones, and acrylics.

In the preferred embodiment of the present invention, gas release paths are provided by the perforated of the cores 34 to improve bonding between layers 28 and shim 26 when using adhesive 36. The adhesive 36 does not limit the effectiveness of the gas release paths. The perforated metal is preferably low carbon or stainless steel. It is preferred that the perforated metal be light gauge, having a thickness ranging between 0.006 and 0.012 inches (0.15 to 0.30 mm). Perforated metal of such a thickness may be economically manufactured.

A preferred facing layer 28 is formed of an expanded graphite material which operates to conduct heat away from fire ring 38 and holder 40. Alternatively, facing layer 28 may be a beater-addition or a compressed sheet. It is desirable to make facing layers 28 as thin as possible to reduce material and manufacturing cost, and lower the resistance to gas passage. Preferably, facing layers 28 have a thickness of at least 0.01 inches (0.25 mm), but no greater than 0.045 inches (1.14 mm).

Metal shim 26 provides a number of advantages, including increased gasket strength and the convenience of constructing thicker gaskets by simply varying the shim material or thickness. As a result, the thickness of the facing layers may be minimized, without compromising gasket strength. The ability to vary shim thickness is of particular importance in service situations involving rebuilding and resurfacing of engine hardware. Shim 26 is preferably made from steel and has a range of thicknesses from at least 0.005 inches (0.13 mm) to 0.25 inches (6.35 mm). Shim 26 may include a coarse surface finish, providing additional avenues for the escape of gases during the adhesive setting process as well as additional surface area for bonding with cores 34.

A method of making a gasket 20 according to the present invention includes the steps securing a core 34 to each of a pair of outer facing layers 28, placing shim 26 between facing layers 28 and bonding cores 34 to shim 26 using adhesive 36. Preferable ways of securing a core 34 to each of facing layers 28 includes either a roller operation or calendering. In general, adhesive 36 will be placed on faces 30 and 32 of shim 26. The adhesive is set or cured by placing a heated surface such as a platen or roller (not shown) in facial contact with an outer surface 50 of facing layers 28. To further promote gas release during the setting process, the heated surface may preferably have a coarse surface finish to provide a path for the escaping gases to follow.

Rather than relying solely on either a roller or platen to set adhesive 36, the gasket components may first be passed through an induction unit in a preheating operation. Additionally, a post baking operation may be appropriate to complete the curing of adhesive 36. The use of a post baking operation is particularly desirable if a coating of a material, such as an anti-friction material requiring the use of heat, is applied to an outer surface of the facing layers.

Figure 3:
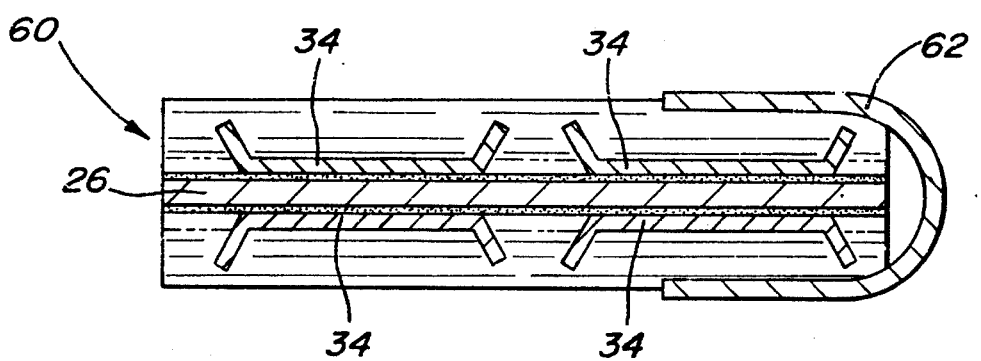
FIG. 3 is a cross-sectional view of a second embodiment of the present invention.

FIG. 3 shows a second gasket embodiment 60. The use of shim 26 in conjunction with cores 34 provides sufficient radial strength to permit the use of a simple combustion opening flange member 62 in place of the fire ring 38 and holder 40 shown in FIG. 2. This reduces material and manufacturing costs.

Figure 4:
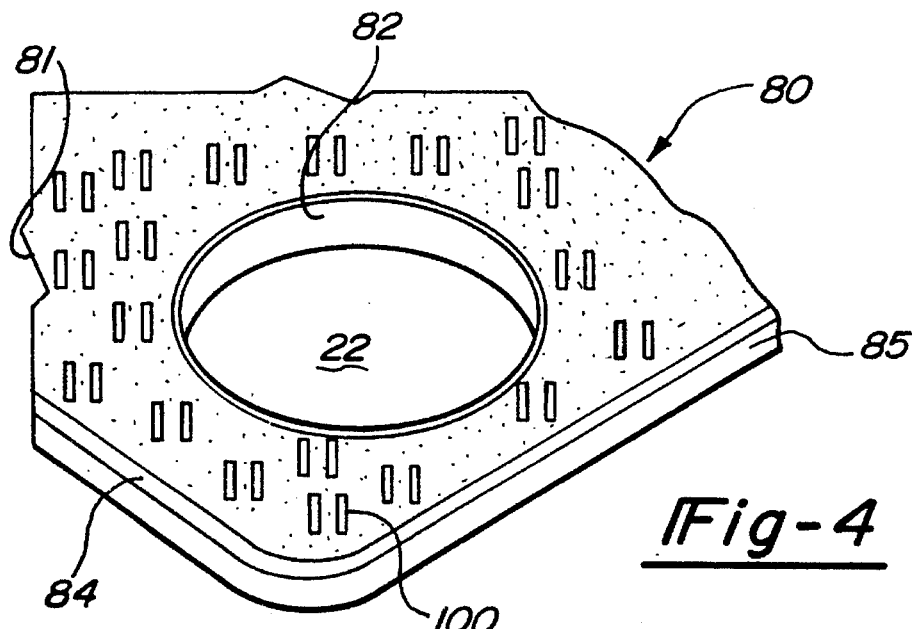
FIG. 4 is a perspective view of a portion of a gasket incorporating a third embodiment of the present invention.
Figure 5:
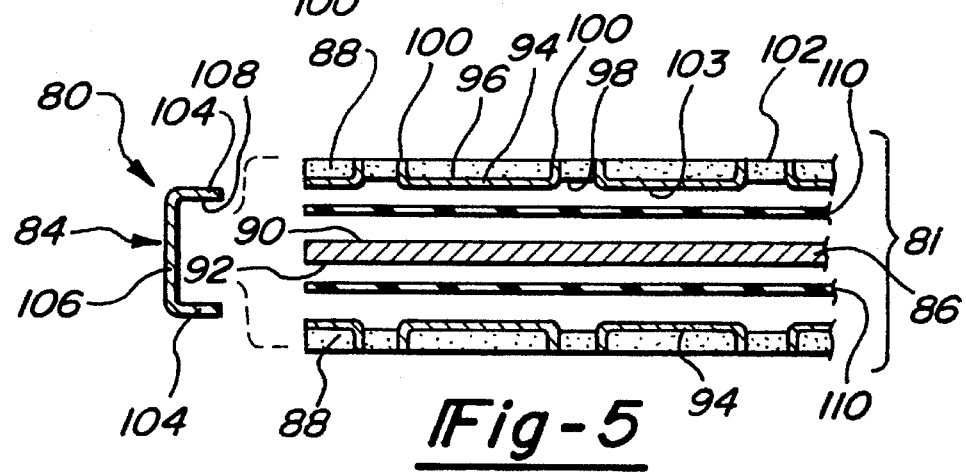
FIG. 5 is an exploded-cross sectional view of the third embodiment of the present invention.
Figure 6:
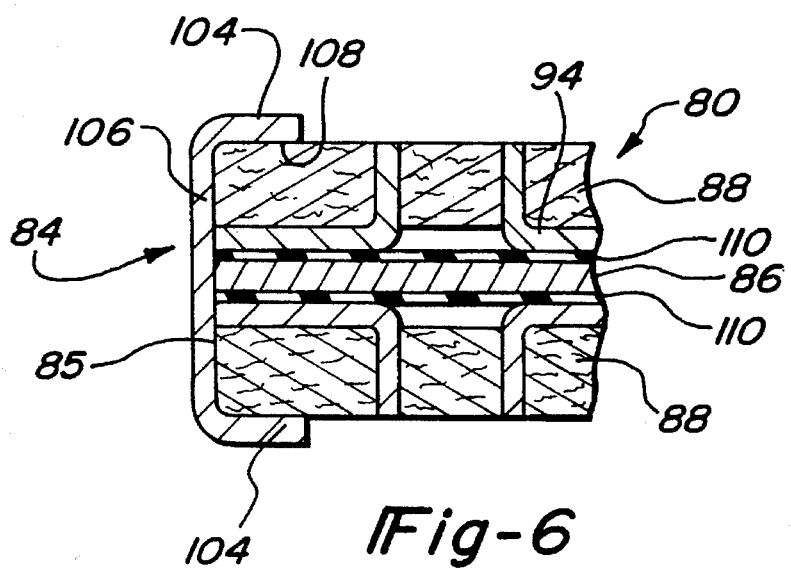
FIG. 6 is an enlarged cross-sectional view of a portion of the third embodiment of the present invention.

FIGS. 4–6 illustrate a third gasket embodiment. Gasket 80, with a gasket body 81, provides a combustion seal at a cylinder bore opening 22 and includes combustion opening flange member 82 which may be a fire ring holder. Unlike the embodiment of FIGS. 1–3, however, rather than relying on adhesive to provide a bond, one or more mechanical fasteners such as eyelets 84 mechanically secure the various gasket components together. In the illustrated embodiment, an eyelet 84 is disposed about an outer periphery 85 of gasket body 81.

Gasket 80 includes a central metal shim 86 with outer facing layers 88 positioned on opposite sides 90 and 92 of shim 86. A perforated metallic core 94 is disposed between layers 88 and shim 86. Each core 94 includes a first planar face 96 contacting an inner surface 98 of layer 88 with a pair of tangs 100 extending outwardly from planar face 96 and into facing layer 88. Tangs 100 extend through layer 88 and are generally flush with an outer surface 102 of layer 88. Core 94 also includes a second planar face 103 adjacent either side 90 or side 92 of shim 86. Core 94 performs the same function as discussed above with respect to core 34.

Adhesion is not required between shim 86 and facing layers 88 because of the mechanical connection provided by eyelet 84. Eyelet 84 has a generally C-shaped cross-section, with two legs 104 separated by a central web 106.

As shown in FIG. 6, web 106 of eyelet 84 is sized such that when body 81 is inserted between inner surface 108 of each leg 104, outer surface 102 of each facing layer 88 is compressed toward shim 86. The compression force exerted by legs 104 secures gasket body 81 together. It is preferable to place one or more eyelets 84 in a non-stressed region of the gasket free from the clamping load exerted on the gasket by mating members of an engine. Otherwise, a portion of the clamping load exerted by the mating members on gasket body 81 would be applied to the eyelets 84 instead, reducing gasket performance. Therefore, gasket body 81 is sized so that periphery 85 is outside of the region of clamping between mating members of the engine.

Metal to metal contact of core 94 with shim 86 does not provide a good seal to limit the passage of gases or fluids through gasket 80. Therefore, a sealing medium 110 is preferably disposed between sides 90 and 92 of shim 86 and the combined cores 94 and facing layers 88. Sealing medium 110 may also be disposed solely between planar face 103 of a core 94 and shim 86. A suitable sealing medium 110 comprises a polymer coating that is adapted to withstand high temperature gasket operation. One such preferred coating is an elastomeric latex or gum rubber applied to faces 90 and 92 using a wet process.

A suitable sealing medium 110 also includes a thermosetting adhesive such as that discussed above. A thermosetting adhesive serves the necessary sealing function. However, because of eyelets 84, the setting and curing of the adhesive is not required as a part of the assembly of gasket 80. In a preferred embodiment using adhesive in conjunction with eyelet 84, the adhesive preferably cures or sets during high temperature engine operation to provide a secondary means of securing shim 86 and facing layers 88 using cores 94. Manufacturing steps related to heating operations are eliminated, reducing manufacturing time and expense while still retaining the benefits of using an adhesive. The adhesive acts as a secondary means for securing the components together.

Preferred embodiments of the present invention have been described. It is to be understood that variations and modifications may be employed without departing from the scope of the present invention. Accordingly, the following claims should be studied to determine the true scope of the present invention.

We claim:

1. A gasket adapted to be positioned between and clamped by mating members, the gasket comprising:

a gasket body with a central metal shim, a pair of outer facing layers positioned on opposite sides of said shim, each of said facing layers having an inner surface and an outer surface, a core disposed between said inner surface of each of said facing layers and said shim, said cores including opposing first and second planar faces, said first planar face of each of said cores positioned against one of said facing layers, wherein said cores include at least one tang extending away from said first planar face into said one of said facing layers to clinch said cores to said one of said facing layers, and a sealing medium disposed between said second planar face of each of said cores and said shim.

2. A gasket as recited in claim 1, wherein said sealing medium is a polymer coating.

3. A gasket as recited in claim 1, wherein said sealing medium is a thermosetting adhesive.

4. A gasket as recited in claim 3, wherein said thermosetting adhesive is adapted to set during high-temperature gasket operation.

5. A gasket as recited in claim 1, wherein each of said facing layers is selected from the group consisting of an expanded graphite material, a beater-addition, and a compressed sheet.

6. A gasket as recited in claim 1, wherein said facing layers have a thickness in the range of 0.01 to 0.045 inches (0.25 to 1.14 mm).

7. A gasket as recited in claim 1, wherein said shim is made from steel and has a thickness of at least 0.005 inches (0.13 mm).

8. A gasket as recited in claim 1, said gasket further including at least one mechanical fastener positioned in a region of said gasket free from the clamping load exerted by the mating members.

9. A gasket as recited in claim 8, wherein said mechanical fastener is disposed about an outer periphery of said gasket body.

10. A gasket as recited in claim 8, wherein said mechanical fastener comprises an eyelet having a generally C-shaped cross-section, with two legs separated by a central web, said central web sized such that when said gasket body is inserted between an inner surface of each of said legs of said eyelet, said gasket body is compressed.

11. A gasket as recited in claim 8, including a plurality of said mechanical fasteners.

12. A gasket adapted to be positioned between and clamped by mating members, said gasket comprising:

a central metal shim;

a pair of outer facing layers formed of graphite and positioned on opposite sides of said shim, each of said facing layers having an inner surface and an outer surface;

a metallic perforated core disposed between each of said facing layers and said shim, said cores including opposing first and second planar faces, said first planar face of each of said cores positioned against one of said facing layers; and a sealing medium disposed between said second planar face of each of said cores and said shim.

13. A gasket as recited in claim 12, wherein said sealing medium comprises an adhesive coated on said opposite sides of said shim and adapted to set during high temperature engine operation, said perforated cores allowing gases to escape during setting of said adhesive to minimize blistering of said facing layers.

14. A cylinder head gasket as recited in claim 13, wherein said shim includes a coarse surface finish to provide additional area for bonding and additional paths for escape of the gases.

15. A gasket as recited in claim 12, wherein said sealing medium comprises a polymer coating applied to said opposite sides of said shim.

16. A gasket as recited in claim 12, said gasket further including at least one mechanical fastener positioned in a region of said gasket free from the clamping load exerted by the mating members.

17. A gasket adapted to be positioned between and clamped by mating members, said gasket comprising:

a central metal shim;

a pair of outer facing layers formed of graphite and positioned on opposite sides of said shim, each of said facing layers having an inner surface and an outer surface;

a metallic perforated core disposed between each of said facing layers and said shim, said cores including opposing first and second planar faces, said first planar face of each of said cores positioned against one of said facing layers, wherein said cores include at least one tang extending away from said first planar face into said one of said facing layers to clinch said cores to said one of said facing layers; and a sealing medium disposed between said second planar face of each of said cores and said shim.

18. A gasket as recited in claim 17, said gasket further including at least one mechanical fastener positioned around an outer periphery of said body.

* * * * *

UNITED STATES PATENT AND TRADEMARK OFFICE
CERTIFICATE OF CORRECTION

PATENT NO. : 5,468,003

DATED : November 21, 1995

INVENTOR(S): Thomas E. Staab, Kanu G. Shah, Paul E. Gallo and Paul V. Rakauskas It is certified that error appears in the above-identified patent and that said Letters Patent is hereby corrected as shown below:

On cover page, [*] Notice section, "Nov. 8, 1974" is deleted and —Feb. 26, 2013— is inserted.

Signed and Sealed this

Twenty-sixth Day of March, 1996

Attest:

BRUCE LEHMAN

Attesting Officer

Commissioner of Patents and Trademarks